United States Patent

Ling et al.

[11] Patent Number: 5,737,327
[45] Date of Patent: Apr. 7, 1998

[54] METHOD AND APPARATUS FOR DEMODULATION AND POWER CONTROL BIT DETECTION IN A SPREAD SPECTRUM COMMUNICATION SYSTEM

[75] Inventors: Fuyun Ling, Hoffman Estates; David E. Borth, Palatine; Colin D. Frank, Schaumburg; Phillip D. Rasky; James F. Kepler, both of Buffalo Grove, all of Ill.

[73] Assignee: Motorola, Inc., Schaumburg, Ill.

[21] Appl. No.: 624,329

[22] Filed: Mar. 29, 1996

[51] Int. Cl.$^6$ .................. H04J 13/04; H04Q 7/20
[52] U.S. Cl. .................. 370/335; 370/318; 370/342; 375/325
[58] Field of Search .................. 370/318, 320, 370/335, 342, 350, 441, 479, 491, 500, 516; 375/205, 206, 354, 362, 371, 325, 326, 340; 455/38.3, 403, 422, 425, 426

[56] References Cited

U.S. PATENT DOCUMENTS

| | | | |
|---|---|---|---|
| 4,901,307 | 2/1990 | Gilhousen et al. | 370/18 |
| 5,329,547 | 7/1994 | Ling | 370/342 |
| 5,361,275 | 11/1994 | Subramanian | 375/200 |
| 5,442,661 | 8/1995 | Falconer | 375/205 |
| 5,544,156 | 8/1996 | Teder et al. | 370/342 |

OTHER PUBLICATIONS

Viterbi, Andrew J., *CDMA: Principles of Spread Spectrum Communication*, Addison-Wesley Publishing Company, 1995, pp. 86–93.

*Primary Examiner*—Hassan Kizou
*Attorney, Agent, or Firm*—John G. Rauch

[57] ABSTRACT

A receiver circuit (400, 500) receives a spread spectrum communication signal, such as a DS-CDMA signal, including a pilot channel and including a power control designator. The signal is despread and decoded. The pilot symbols on the pilot channel are provided to a channel estimator (408) for estimating the channel phase and channel gain of the communication channel. This estimate is provided to a demodulator (422) for demodulating the traffic channel symbols. The pilot symbols are provided to another channel estimator (410) for estimating channel phase and channel gain for the power control designator. This estimate is provided to a demodulator (424) for demodulating the power control designator. The traffic channel symbols are delayed a predetermined time in a delay element (420) before demodulating. The power control designator is delayed a short time or not at all in a short delay element (418) before demodulation.

33 Claims, 3 Drawing Sheets

METHOD AND APPARATUS FOR DEMODULATION AND POWER CONTROL BIT DETECTION IN A SPREAD SPECTRUM COMMUNICATION SYSTEM

FIELD OF THE INVENTION

The present invention relates generally to spread spectrum radio communication. The present invention more particularly relates to a method and apparatus for demodulation and power control bit detection for use in a receiver in a spread spectrum communication system using a pilot channel.

BACKGROUND OF THE INVENTION

Radio systems provide users of radio subscriber units with wireless communications. A particular type of radio system is a cellular radiotelephone system. A particular type of radio subscriber unit is a cellular radiotelephone subscriber unit, sometimes referred to as a mobile station. Cellular radiotelephone systems generally include a switch controller coupled to the public switched telephone network (PSTN) and a plurality of base stations. Each of the plurality of base stations generally defines a geographic region proximate to the base station to produce coverage areas. One or more mobile stations communicate with a base station that facilitates a call between the mobile station and the public switched telephone network. The base station provides radiotelephone communication service between mobile stations operating in the cell and the public switched telephone network (PSTN). The communication link over a carrier signal from the base station to a mobile station is referred to as the downlink. Conversely, the communication link from a mobile station to the base station is referred to as the uplink. A description of a cellular radiotelephone system is available in the book "Mobile Cellular Communications Systems" by Dr. William C. Y. Lee, 1989.

A particular type of cellular radiotelephone system employs spread spectrum signalling. Spread spectrum signalling can be broadly defined as a mechanism by which the bandwidth occupied by a transmitted signal is much greater than the bandwidth required by a baseband information signal. Two categories of spread spectrum communications are direct sequence spread spectrum (DSSS) and frequency-hopping spread spectrum (FHSS). The spectrum of a signal can be most easily spread by multiplying it with a wideband pseudorandom code-generated signal. It is essential that the spreading signal be precisely known so that the receiver can despread the signal. The essence of the two techniques is to spread the transmitted power of each user over such a wide bandwidth (1–50 MHz) that the power per unit bandwidth, in watts per Hertz, is very small.

Spread spectrum signalling provides improved performance relative to other narrow band techniques. Frequency-hopping systems achieve their processing gain by avoiding interference. Direct sequence systems use an interference attenuation technique. For DSSS, the objective of the receiver is to pick out the transmitted signal from a wide received bandwidth in which the signal is below the background noise level. In order to do this, the receiver must know the carrier signal frequency, type of modulation, pseudorandom noise code rate, and phase of the code, since signal to noise ratios are typically −15 to 30 dB. Determining the phase of the code is the most difficult of these.

The DSSS technique acquires superior noise performance, compared to frequency hopping, at the expense of increased system complexity. In addition, the DSSS receiver must lock onto and track the correct phase of the received signal within one chip time (i.e. a partial or subinteger bit period).

A cellular radiotelephone system using DSSS is commonly known as a Direct Sequence Code Division Multiple Access (DS-CDMA) system, according to TIA/EIA standard IS-95. Individual users in the system use the same RF frequency but are separated by the use of individual spreading code. Other spread spectrum systems include radiotelephone systems operating at 1900 MHz, commonly referred to as DCS1900. Other radio and radiotelephone systems use spread spectrum techniques as well.

In a spread spectrum communication system, downlink transmissions include a pilot channel and a plurality of traffic channels. The pilot channel is decoded by all users. Each traffic channel is intended for decoding by a single user. Therefore, each traffic channel is encoded using a code known by both the base station and mobile station. The pilot channel is encoded using a code known by the base station and all mobile stations.

The pilot channel serves many purposes. Among these are providing timing and carrier phase synchronization in the receiver of a mobile station, estimation of the gain of the channel and the phase shift imposed by the channel, for diversity combining and for convolutional soft decoding. The performance of the mobile station receiver depends on the accuracy of estimation of channel phase and channel gain.

At the receiver, the pilot channel signal is despread to obtain a despread channel signal. The despread pilot channel signal contains channel information, including channel phase and channel gain, that is corrupted by noise and interference. More accurate channel phase and gain information must be extracted from the despread pilot channel signal for demodulation and decoding.

Conventionally, estimates of channel phase have been generated separately from estimates of channel gain. Typically, the phase of the despread pilot channel signal has been used to drive a phase locked loop that generated a more accurate channel phase estimate to be used for coherent demodulation. The magnitudes of the despread pilot channel symbols, or their squares, were averaged to generate a channel gain estimate when this quantity is needed, such as for diversity combining and soft decoding.

While such an implementation using a phase locked loop can provide an adequate performance in many situations, the performance may be limited when the quality of the communication channel is marginal. In such situations, a better method and apparatus for demodulation of the spread spectrum communication signal is necessary.

In addition to the normal pilot channel and traffic channel signals, downlink transmissions also include a power control indicator in the traffic channel. The power control indicator is transmitted by the remote base station to the mobile station to control the transmission power of the mobile station. The power control indicator conventionally includes several bits which are not encoded in any way. In response to the power control indicator, the mobile station adjusts its transmission power to accommodate changing channel conditions, such as fading or blocking or the sudden absence of these. For accurate, reliable communication, rapid response by the mobile station to the received power control indicator is necessary.

Accordingly, there is a need in the art for an improved method and apparatus for demodulation of a spread spectrum communication signal, including rapid, accurate detection of power control bits.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF A PREFERRED EMBODIMENT

Figure 1:
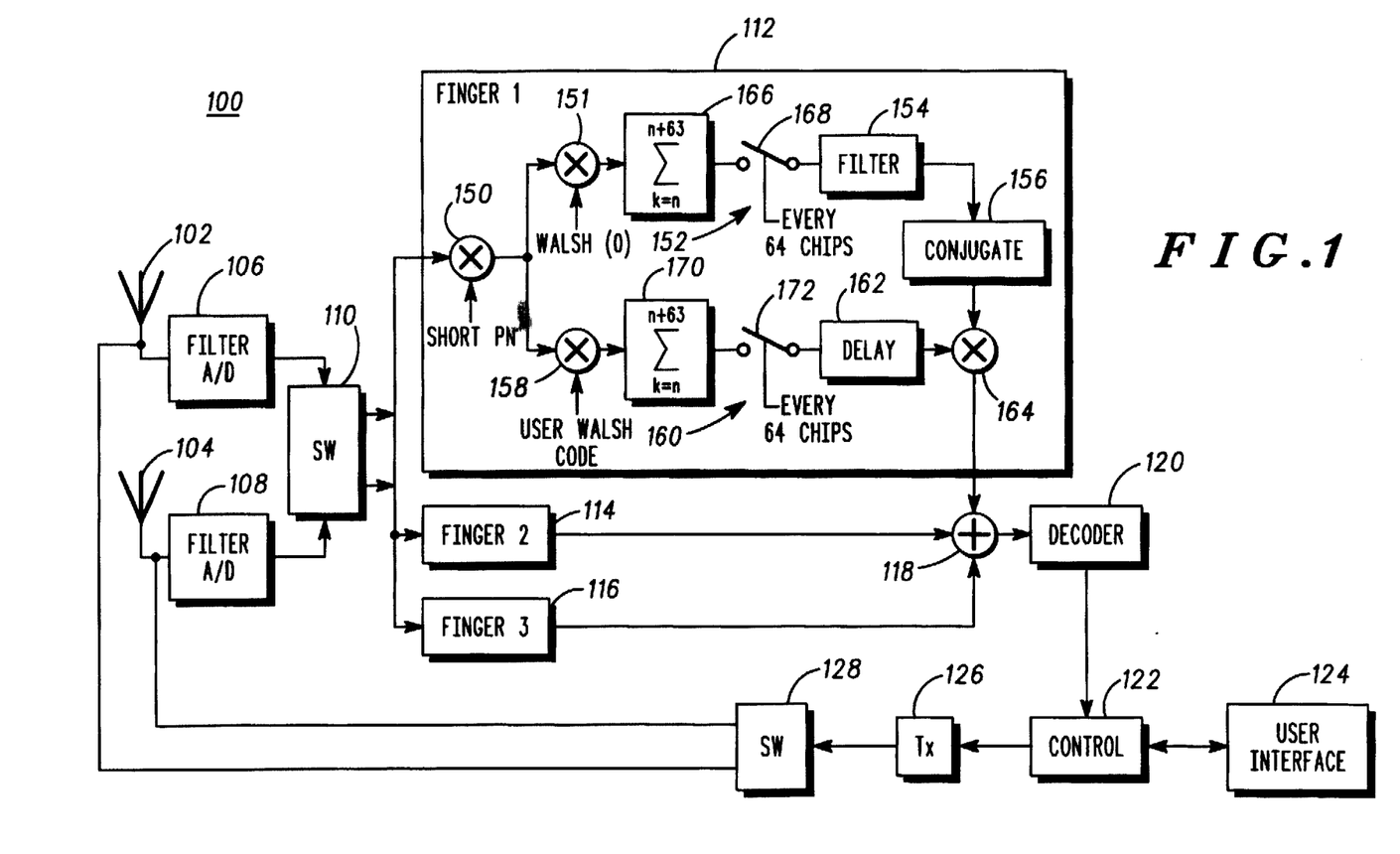
FIG. 1 is an operational block diagram of a radiotelephone mobile station.

Referring now to FIG. 1, it shows an operational block diagram of a radiotelephone mobile station 100. The mobile station 100 includes a first antenna 102, a second antenna 104, a first filter circuit 106, a second filter circuit 108, an antenna switch 110, a first receiver finger 112, a second receiver finger 114, a third receiver finger 116, a combiner 118, a decoder 120, a controller 122, a user interface 124, a transmitter 126 and an antenna switch 128. The mobile station 100 is preferably configured for use in a DS-CDMA cellular radiotelephone system including a plurality of remotely located base stations. Each base station includes a transceiver which sends and receives radio frequency (RF) signals to and from mobile stations, including mobile station 100, within a fixed geographic area. While this is one application for the mobile station 100, the mobile station 100 may be used in any suitable spread spectrum communication system.

In the mobile station 100, the first antenna 102 and the second antenna 104 send and receive RF signals to and from a base station (not shown). RF signals received at the first antenna 102 are filtered, converted from analog signals to digital data and otherwise processed in first filter circuit 106. Similarly, RF signals received at the second antenna 104 are filtered, converted from analog signals to digital data and otherwise processed in second filter circuit 108. The first filter circuit 106 and second filter circuit 108 may also perform other functions such as automatic gain control and downconversion to intermediate frequency (IF) for processing.

In an alternative embodiment, the mobile station 100 may include only a single antenna and a single filter circuit. However, provision of two antennas and associated filter circuits provides the mobile station 100 with space diversity. In a space diversity system, a transmitted signal travels by slightly different paths from the transmitter to the two antennas at the receiver, due to multipath reflection or other causes. Although the path from the transmitter to one of the two antennas may cause phase cancellation of the transmitted and reflected path waves, it is less probable that multiple paths to the other antenna will cause phase cancellation at the same time. The antenna switch 110 selects between the first antenna 102 and the second antenna 104 as the source of received RF signals.

The mobile station 100 preferably employs a rake receiver including first receiver finger 112, second receiver finger 114 and third receiver finger 116 for receiving a spread spectrum communication signal over a communication channel. The rake receiver design using multiple fingers is conventional. The output signals from each finger of the rake receiver are combined by the combiner 118. The structure and operation of first receiver finger 112 will be discussed in greater detail below. Preferably, second receiver finger 114 and third receiver finger 116 operate substantially the same as first receiver finger 112.

As noted, the combiner 118 combines the output signals of the rake receiver fingers and forms a received signal. The combiner 118 provides the received signal to the decoder 120. The decoder 120 may be a Viterbi decoder or another type of convolutional decoder or any other suitable decoder. The decoder 120 recovers the data transmitted on the RF signals and outputs the data to the controller 122. The controller 122 formats the data into recognizable voice or information for use by user interface 124. The controller 122 is electrically coupled to other elements of the mobile station 100 for receiving control information and providing control signals. The control connections are not shown in FIG. 1 so as to not unduly complicate the drawing figure. The controller 122 typically includes a microprocessor and memory. The user interface 124 communicates the received information or voice to a user. Typically, the user interface 124 includes a display, a keypad, a speaker and a microphone.

Upon transmission of radio frequency signals from the mobile station 100 to a remote base station, the user interface 124 transmits user input data to the controller 122. The controller 122 formats the information obtained from the user interface 124 and conveys it to the transmitter 126 for conversion into RF modulated signals. The transmitter 126 conveys the RF modulated signals to the antenna switch 128. The antenna switch 128 selects between the first antenna 102 and the second antenna 104 for transmission to the base station.

The structure and operation of each of the rake receiver fingers for receiving and demodulating signals will now be discussed, using first receiver finger 112 as an example. In accordance with the present invention, the mobile station 100 is configured to receive a spread spectrum communication signal, preferably a direct sequence code division multiple access (DS-CDMA) signal, over a communication channel. The spread spectrum communication signal includes a pilot channel and a plurality of traffic channels. At a transmitter, such as at a base station in a cellular radiotelephone system, the pilot channel and traffic channels are encoded using different Walsh codes. Typically, the pilot channel is encoded using a Walsh(0) code, a first traffic channel is encoded using a Walsh(2) code, etc. After encoding, the signal spectrum is spread using a pseudorandom noise (PN) code. The spread spectrum signal in digital form comprises a series of chips whose respective values are defined by the PN code and the encoded data. The Walsh encoding for each traffic channel is unique to that channel and to the intended receiver. Each receiver in the system, or subscriber in a cellular radiotelephone system, is assigned a unique Walsh code corresponding to the traffic channel on which it communicates with the base station for decoding the traffic channel. Each receiver also decodes the pilot channel. In accordance with the present invention, the pilot channel is used to estimate channel phase and channel gain of the communication channel.

First receiver finger 112 includes a despreader 150, a pilot channel decoder 151, a pilot channel summer 152, a filter 154, a conjugate generator 156, a traffic channel decoder 158, a traffic channel summer 160, a delay element 162 and a demodulator 164. It will be recognized by those ordinarily skilled in the art that these elements may be implemented in hardware or in software, or in some combination of the two which enhances efficiency and manufacturability.

The despreader 150 receives from the antenna switch 110 a digital representation of the spread spectrum communication signal received by the mobile station 100. The despreader applies a pseudorandom noise (PN) code to the received signal. The despreader despreads the received signal, producing a despread signal. The PN code is stored at the mobile station 100 and may be transmitted to the mobile station 100, for example from a base station, when the communication channel between the base station and the mobile station 100 is initiated. The PN code is unique to the mobile station 100, so that no other receiver in communication with the base station may decode the traffic channel transmitted to the mobile station 100.

The despread signal is provided from the despreader 150 to the pilot channel decoder 151. The pilot channel decoder applies a pilot channel code to the despread signal to produce the pilot channel signal. The pilot channel code is typically the Walsh code Walsh(0). The pilot channel decoder applies the decoded signal to the pilot channel summer 152. The pilot channel summer 152 includes a summer 166 and a switch 168. The summer 166 sums 64 consecutive chips to form a pilot symbol. After every sixty-fourth chip, the switch 168 closes to couple the summer 166 to the filter 154 to provide a received pilot symbol to the filter 154. Thus the pilot channel summer 152 detects the pilot channel.

The embodiment shown in FIG. 1 is suitable if a Walsh code is used for encoding the pilot channel. Since Walsh(0) consists of all ones, no decoding is necessary when the pilot channel is encoded using Walsh(0) and the pilot channel decoder may be omitted. However, if another Walsh code or another type of coding is used to encode the pilot channel, a decoder is necessary. Such a decoder applies a pilot code to the despread signal to produce the pilot channel signal. In the preferred embodiment, the pilot code is common to all users in communication with the base station.

The filter 154 receives the pilot symbols from the pilot channel summer 152. The filter 154 filters the pilot channel signal to obtain a complex representation of an estimated channel gain and an estimated channel phase for the communication channel, in a manner to be described below.

It is known from communication theory that, if the true channel gain $|h(n)|$ and phase $\phi_h(n)$ at time nT are known, the optimal demodulation can be implemented according to:

$$e^{-j\theta_h(n)} r(n) \tag{1}$$

where r(n) is the traffic channel symbol at the output of the traffic channel summer 160. The optimal (maximum likelihood) soft weighted value used in combining is the real part of $$|h|_e^{-j\theta_h(n)} r(n) \tag{2}$$

for (encoded) bits in a BPSK modulated symbol at nT and the real and imaginary parts of (2) for the two bits in a QPSK modulated symbol at nT, respectively, provided the noise is stationary and has the same variance for each finger or antenna of the mobile station 100.

The quantity given by (2) can be rewritten as:

$$h^*(n)r(n) \tag{3}$$

where $$h(n) = |h(n)| e^{j\theta_h(n)} \tag{4}$$

is the complex representation of the channel coefficient. For a fading mobile channel, h(n) is a low-pass random process. The highest frequency in the spectrum of h(n) is equal to the Doppler frequency for a mobile communication channel.

Since the complex channel coefficient is not known, it is necessary to estimate the magnitude and phase of the channel coefficient. The estimated channel coefficient is used instead of its true value for demodulation and generating soft-weighting values in the receiver. Specifically, denoting $\hat{h}(n)$ be an estimate of h(n), the soft-weighting value for combining and decoding is computed as the real and imaginary parts of $$\hat{h}^*(n)r(n) \tag{5}$$

It is possible to estimate the channel phase and gain jointly using the pilot symbol.

The pilot symbol can be expressed as $$p(n) = \alpha[h(n) + z(n)] \tag{6}$$

where $\alpha$ is a constant depending on the receiver implementation, and z(n) is stationary additive white noise or interference. Since cc does not change once the receiver is designed, without loss of generality, we let $\alpha=1$.

The pilot symbol p(n) can be used as an estimate of h(n). However, a more accurate estimate of h(n) can be obtained by averaging over a few p(n), such that $$\hat{h}(n) = \sum_{k=-K_1}^{K_2} w(k)p(n-k), \tag{7}$$

where w(k) are the weighting coefficients. When $K_1 > 0$, delay must be introduced before demodulation can be performed.

The optimal weighting coefficients w(k) can be computed $$W = R^{-1}\Phi \tag{8}$$

where the weighting vector $W = [w(-K_1), \ldots, w(0), \ldots, w(K_2)]^t$, R is the autocorrelation matrix of p(n−k) and $\Phi$ is the cross-correlation vector between p(n−k) and h(n). These values can be computed if the statistics of h(n) are known.

When the statistics of the channel variation are not known, the optimal weighting coefficients cannot be determined exactly. An example of this situation occurs when the Doppler frequency changes during a communication session and the receiver only knows the maximum value of the Doppler frequency. In such a case, the weighting coefficients will have a low pass frequency response. The maximal Doppler frequency of the channel should be within the passband of this low pass response.

The filter 154 is preferably a low pass filter. The input of the filter is the pilot symbols p(n). The output of the filter is the estimate ĥ(n) of the channel coefficient. ĥ(n) is a complex number containing both phase and magnitude information. The phase information corresponds to an estimate of channel phase. The magnitude information corresponds to an estimate of channel gain. Possible implementations of the filter 154 will be described below in conjunction with FIGS. 2 and 3. The conjugate generator 156 determines the complex conjugate of the signal ĥ(n) produced by the filter 154. The filter 154, in conjunction with the conjugate generator 156, produces an estimate of the complex conjugate of the complex representation of channel gain and channel phase for the communication channel. The complex conjugate of the complex representation of the channel phase and the channel gain are provided to the demodulator 164.

The despread signal is also provided from the despreader 150 to the decoder 158. The decoder 158 applies a user specific traffic code to the despread signal to produce the traffic channel signal. The user specific traffic code is the Walsh code Walsh(n) assigned to the mobile station 100. The traffic channel signal is provided to the traffic channel summer 160.

The traffic channel summer 160 includes a summer 170 and a switch 172. The summer 170 sums 64 consecutive chips to form a traffic symbol. After every sixty-fourth chip, the switch 172 closes to couple the summer 170 to the delay element 162 to provide a received traffic symbol to the delay element 162. Thus the traffic channel summer 160 detects the traffic channel. More specifically, the traffic channel summer 160 detects the traffic symbol r(n).

The delay element 162 is preferably a FIFO, or first in, first out buffer. The filter 154 introduces a filter delay when estimating the channel gain and channel phase. The delay element 162 compensates for this filter delay to ensure that the estimated channel phase and estimated channel gain are used to demodulate the corresponding traffic symbols. The delay element 162 delays the spread spectrum communication signal a predetermined time to produce a delayed signal. More specifically, the delay element 162 delays only the traffic symbols of the traffic channel to produce the delayed traffic symbols.

The inventors have determined that delaying the traffic symbols by about 0.5 to 2 milliseconds provides the best results in a DS-CDMA cellular radiotelephone. More specifically, the inventors have determined that a delay of 31 symbols, corresponding to 1.5 milliseconds, produces the best results. The receiver performance under these conditions is only 0.15 dB from the ideal (unachievable) receiver performance using known channel gain and channel phase. However, reducing the delay to 0.5 milliseconds and using an appropriate filter will yield little degradation in receiver performance.

The delayed traffic symbols are provided to the demodulator 164. The demodulator 164 may be implemented as a multiplier which multiplies the delayed traffic symbols and the signal received from the conjugate generator 156, demodulating the delayed traffic symbols using the estimated channel phase and estimated channel gain. The result of this multiplication is provided to the decoder 120 for further processing.

Figure 2:
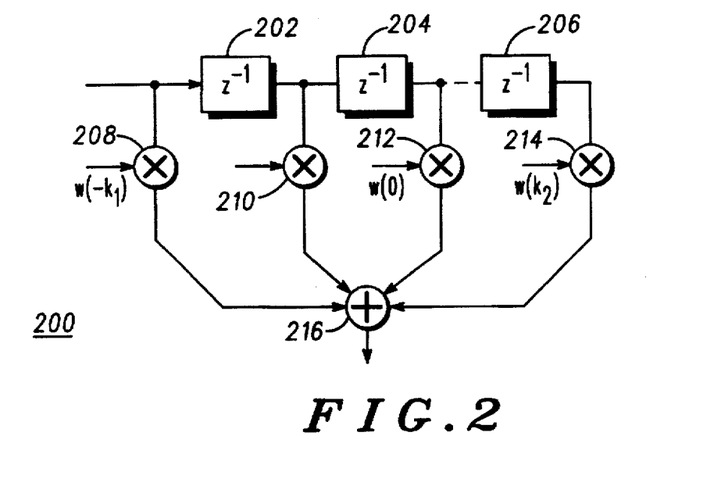
FIG. 2 is a block diagram of a first filter for use in the radiotelephone mobile station of FIG. 1.

Referring now to FIG. 2, it shows a block diagram of a finite impulse response (FIR) filter 200 for use in the radiotelephone mobile station 100 of FIG. 1. The filter 200 may be used for providing the low pass filtering function of the filter 154 in FIG. 1. The filter 200 includes delay elements 202, 204, 206, multipliers 208, 210, 212 and 214, and a summer 216.

Preferably, the filter 200 uses a total of 61 delay elements such as delay elements 202, 204, 206, not all of which are shown in FIG. 2 so as not to unduly complicate the drawing figure. The delay elements operate in sequential phases, shifting pilot symbols serially through the chain of delay elements. The delay elements are coupled in series so that, during a first phase, delay element 202 receives a first pilot symbol from the pilot channel summer 152 (FIG. 1). After a delay equal to one pilot symbol period, during a second phase, the first pilot symbol is conveyed from delay element 202 to delay element 204 and a second pilot symbol is conveyed from the pilot channel summer 152 to delay element 202. Again, after a delay equal to one pilot symbol period, during a third phase, the first pilot symbol is conveyed from delay element 204 to the next delay element series-coupled with delay element 204, the second pilot symbol is conveyed from delay element 202 to delay element 204, and a third pilot symbol is conveyed from pilot channel summer 152 to delay element 202.

During each phase, the pilot symbols stored at each delay element are multiplied with a weighting coefficient by a respective multiplier 208, 210, 212, 214. Preferably the filter 200 uses a total of 62 multipliers such as multipliers 208, 210, 212 and 214, not all of which are shown in FIG. 2. Each multiplier corresponds to one of the delay elements 202, 204, 206. The multipliers multiply the delayed pilot symbol stored in the respective delay element by a weighting coefficient. Also, multiplier 208 multiplies the incoming pilot symbol, at the input of delay element 202, by a weighting coefficients.

The weighting coefficients w(k) are preferably calculated according to equation (8) above. Alternatively, the weighting coefficients may be estimated according to any appropriate method. In one simple example, all of the w(k) weighting coefficients may be set equal to unity. In such an implementation, the filter 200 is a low pass filter averaging a predetermined number (for example, 42) of pilot symbols without weighting. Preferably, the weighting coefficients w(k) are chosen so that the filter 200 has a frequency response close to the low pass response described above. Thus, the filter 200 operates to sample a predetermined number (for example 61) of pilot symbols, multiply the sampled pilot symbols by weighting coefficients, and combine the products to produce an complex representation of the estimate of channel gain and channel phase.

In an alternative embodiment, the filter 154 (FIG. 1) could be implemented using a low pass infinite impulse response (IIR) filter. Such an IIR filter should have a near-linear phase response within its passband.

The filter 154 is characterized by a group delay at the frequency of interest. For a linear phase FIR filter, such as the filter 200, the group delay of the filter is equal to one-half the delay or length of the filter. For a non-linear-phase FIR or for an IIR filter, the group delay is defined as $$\frac{d\phi(f)}{df}\bigg|_{f_0}$$

where $\phi$ is the phase rotation introduced by the filter at frequency $f$ and $f_0$ is the frequency of interest. In accordance with the present invention, the delay introduced by the delay element 162 is substantially equal to the group delay of the filter 154.

Figure 3:
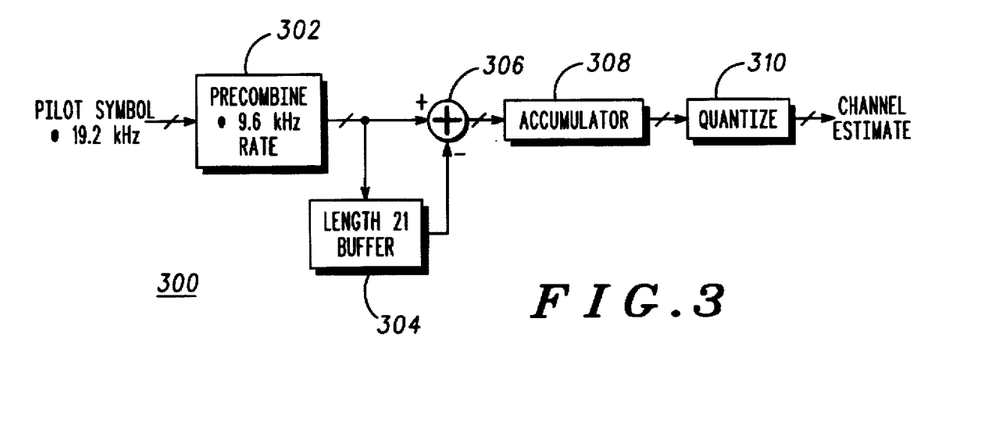
FIG. 3 is a block diagram of a second filter for use in the radiotelephone mobile station of FIG. 1.

FIG. 3 is a block diagram of a filter 300 for use in the radiotelephone mobile station of FIG. 1. The filter 300 includes a precombiner 302, a buffer 304, a summer 306, an accumulator 308, and a quantizer 310. The precombiner 302 is coupled to the pilot channel summer 152 (FIG. 1) and receives the despread pilot symbols at a predetermined rate, such as 19.2 KHz. The precombiner 302 combines subsequently received pilot symbols to form combined pilot symbols. This acts to reduce the memory requirements of the filter 300. For example, the precombiner may add two pilot symbols, designated p(n) and p(n+1) together to produce a combined pilot symbol, which is then stored. In applications where memory requirements are not a concern, the precombiner may be omitted.

The precombiner 302 shifts the combined pilot symbols sequentially into the buffer 304. The buffer prefer, ably stores 21 combined pilot symbols, corresponding to 42 pilot symbols received from the pilot channel summer 152. This also corresponds to a group delay of 1.1 milliseconds.

During each combined pilot symbol period, the buffer 304 shifts a new combined pilot symbol into the buffer 304 and shifts the oldest combined pilot symbol out of the buffer 304. The summer 306 sums the contents of the buffer with the new combined pilot symbol provided by the precombiner 302 to the summer 306. The sum is accumulated in the accumulator 308. The sum is then quantized to reduce circuit complexity. This quantized result corresponds to the estimate of the channel phase and channel gain.

As noted, the filter 300 is characterized by a group delay, preferably equal to 21 pilot symbols or 1.1 milliseconds. In accordance with the present invention, if the filter 300 is used to provide the filtering function of the filter 154 (FIG. 1), the delay introduced by the delay element 162 is substantially equal to the group delay of the filter 300.

As has been shown, nearly optimal DS-CDMA downlink receiver performance can be achieved by using a low pass filter to jointly estimate channel phase and gain. To achieve this near-optimal performance, it is necessary to allow a demodulation delay on the order of one to two milliseconds. While such a modest delay is tolerable for speech communication, it may be undesirable for detection and demodulation of the power control indicator transmitted from the base station and received at the mobile station as a power control designator. For example, TIA/EIA Specification IS-95, which defines the DS-CDMA standard, requires that mobile station output power be established within 0.3 dB of its final value within 500 microseconds of receipt of power control bits by the mobile station. Accordingly, separate demodulation is required for the power control indicator.

In order to reduce the delay in the detection of the power control indicator without sacrificing traffic channel performance, the present invention separates the demodulation of power control indicator from the demodulation of traffic channel signals. More specifically, the present invention employs two separate demodulators, one for demodulation of the power control indicator with little or no demodulation delay and the other with longer delay appropriate for demodulation of traffic channel signals, as described above. Thus, the method according to the present invention includes jointly estimating a complex representation of a traffic channel phase and a traffic channel gain and separately estimating a complex representation of a power control channel phase and a power control channel gain. The traffic channel signals are demodulated using the traffic channel phase and the traffic channel gain. The power control designator is demodulated with the power control channel phase and the power control channel gain.

This approach is feasible because, with reference to a DS-CDMA system, the power control bits are uncoded and the error rate curve for an uncoded signal is typically quite flat in the signal-to-noise ratio range of interest. As a result, the present invention uses an estimator with little or no delay for demodulation and detection of power control bits. The error rate of the power control designator generated by using such a zero short delay channel estimator is only slightly inferior to the error rate generated by using a nearly optimal estimator with sufficient delay. Moreover, uplink receiver performance (that is, the receiver at the base station which receives transmissions from the mobile station incorporating a receiver according to the present invention) is not very sensitive to the error rate of the power control designator. Thus, communication channel performance will not degrade noticeably due to the use of the zero or short delay estimator.

Figure 5:
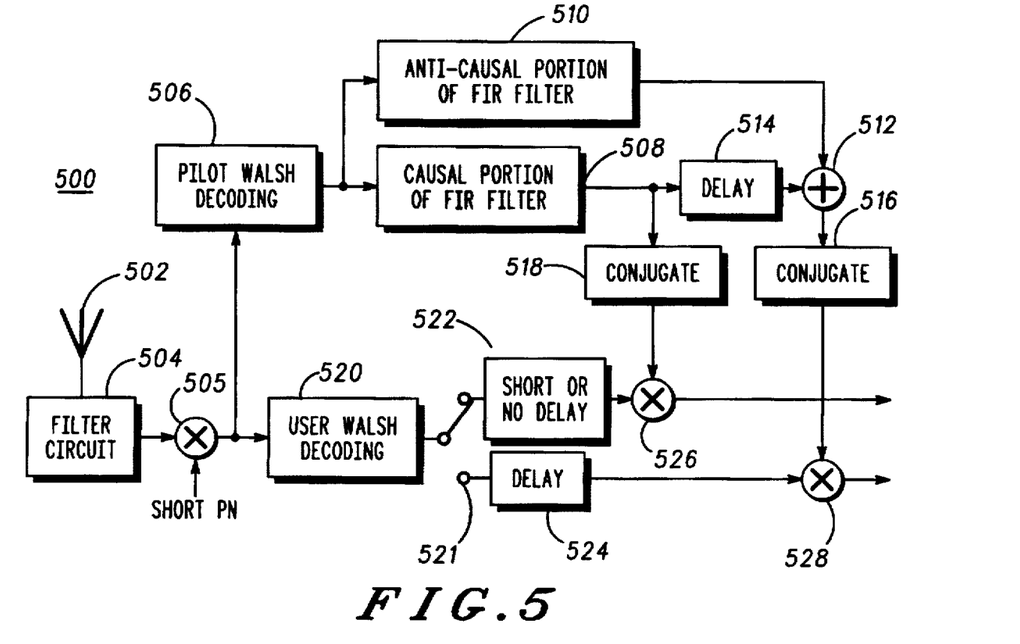
FIG. 5 is a second alternative operational block diagram of a receiver circuit for use in the radiotelephone mobile station of FIG. 1.
Figure 6:
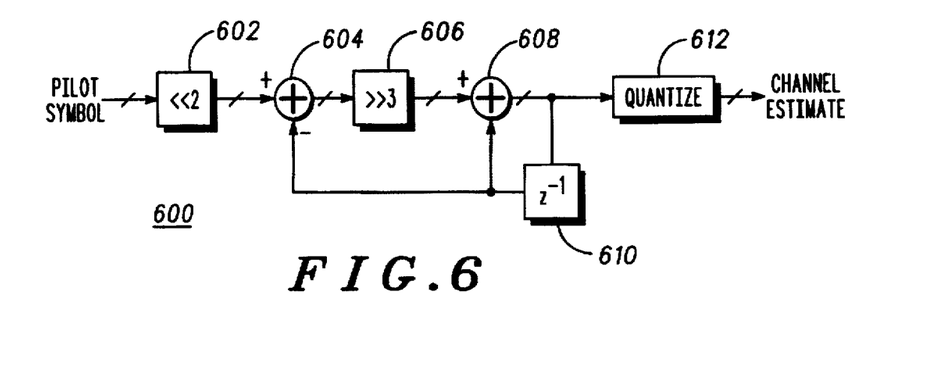
FIG. 6 is an operational block diagram of a power control channel estimator for use in the receiver circuit of FIG. 4.

Although the demodulated power control signal and the demodulated traffic signal have different delays, these delays are preferably fixed and known. Therefore, there is no confusion about the nature of the demodulated signal received at the combiner 118 (FIG. 1). Also, although it is necessary to implement two separate channel estimators for the present invention, the complexity of a receiver according to the present invention is not substantially increased over prior art implementations. Three possible embodiments are illustrated in FIGS. 4–6.

Figure 4:
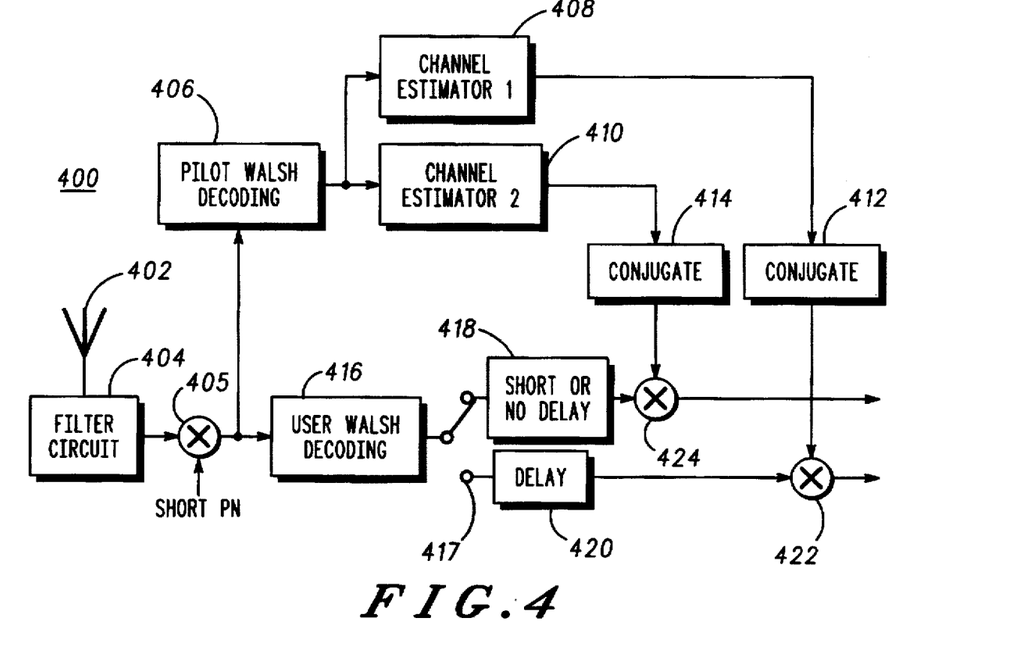
FIG. 4 is a first alternative operational block diagram of a receiver circuit for use in the radiotelephone mobile station of FIG. 1.

Referring now to FIG. 4, it shows a first alternative operational block diagram of a receiver circuit 400 for use in the mobile station 100 of FIG. 1. The receiver circuit 400 may be used as one finger of a rake receiver circuit, as illustrated in FIG. 1, for demodulating DS-CDMA signals and other spread spectrum communication signals. The receiver circuit 400 is configured to be coupled to an antenna 402 and includes a filter circuit 404, a despreader 405, a pilot channel decoder 406, a first channel estimator 408, a second channel estimator 410, a first conjugate generator 412 and a second conjugate generator 414. The receiver circuit 400 further includes a traffic channel decoder 416, a switch 417, a short delay element 418, a delay element 420, a traffic channel demodulator 422 and a power control demodulator 424.

In operation, spread spectrum signals are transmitted by a remote transmitter over a communication channel and detected by the antenna 402. The spread spectrum signals are processed by the filter circuit 404, as described above in connection with FIG. 1. At despreader 405, a despreading code such as short pseudorandom noise (PN) code is applied to the received spread spectrum signals. The PN code is used in the depsreader 405 for despreading the signal at the receiver. The despreader 405 produces a despread signal.

The despread signal is conveyed to the pilot channel decoder 406. The pilot channel decoder 406 applies a code, such as a Walsh code, to the despread signal to decode the signal and the decoded signal is summed to produce pilot symbols. The code is common to all users in the system so that all users can decode the pilot channel. The pilot channel may consist, for example, of data comprising all logic 1's to permit determination of the phase and gain of the communication channel. In applications such as a DS-CDMA system according to IS-95, where the pilot channel is encoded using the Walsh(0) code, the function of applying this Walsh code to the despread signal in the pilot channel decoder 406 may be omitted. The pilot channel decoder 406 produces pilot symbols. The pilot symbols are provided to the first channel estimator 408 and the second channel estimator 410.

The first channel estimator 408 estimates the channel phase and channel gain for a traffic channel, producing a first estimated channel gain and a first estimated channel phase. The first channel estimator 408 may be implemented as a low pass filter, as described above in connection with FIGS. 2–3, or in any other suitable manner. For example, a fourth order infinite impulse response (IIR) filter with a delay of 1.5 milliseconds yields a nearly optimal performance. A 61 tap finite impulse response (FIR) filter yields similar performance with approximately the same delay.

The first channel estimator 408 produces a complex number having a magnitude and a phase and containing information corresponding to the channel phase and the channel gain. This complex number is provided to the first conjugate generator 412 which determines the complex conjugate of the complex number. The conjugate of the complex number is provided to the traffic channel demodulator 422.

The second channel estimator 410 estimates the channel phase and channel gain for the power control indicator or power control bits, producing a second estimated channel gain and a second estimated channel phase. The second channel estimator 410 may be implemented as a low pass filter. If IIR estimators are used for implementing the receiver circuit 400, it is more efficient to use a separate one-pole IIR filter as the estimator for the power control bits. In such an implementation, the second IIR filter must be evaluated for each pilot symbol. This increases computational complexity, but only slightly because such an estimator is very simple. An alternative embodiment of the second channel estimator will be described below in conjunction with FIG. 6.

The second channel estimator 410 produces a complex number having a magnitude and a phase and containing information corresponding to the channel phase and the channel gain for the power control designator. This complex number is provided to the second conjugate generator 414 which determines the complex conjugate of the complex number. The conjugate of the complex number is provided to the power control demodulator 424.

The despread signal is also conveyed to the traffic channel decoder 416. The despread signal contains both traffic data and a power control designator. The traffic data correspond to information, such as voice or data, communicated from a remote transmitter over the channel to the receiver circuit 400. The traffic data are encoded. The power control designator corresponds to power control information transmitted from the remote transmitter to the receiver circuit to control the transmit power of a transmitter associated with the receiver circuit, such as transmitter 126 (FIG. 1). The power control designator is not convolutionally encoded. The traffic channel decoder applies a traffic code, such as a Walsh code, to the despread signal to decode the signal. The traffic code is unique to the receiver circuit 400 so that other users in a system including the receiver circuit 400 cannot decode the signal. The traffic channel decoder 416 produces traffic symbols corresponding to both the power control designator and the traffic data. The traffic symbols corresponding to the power control indicator are called power control symbols.

The switch 417 selectively provides the traffic symbols to either the short delay element 418 or the delay element 420. When the traffic symbols correspond to the power control designator, the switch 417 provides the traffic symbols to the short delay element 418. When the traffic symbols correspond to traffic data, the switch 417 provides the traffic symbols to the delay element 420.

The delay element 420 delays the traffic symbols by a first predetermined time producing a delayed traffic channel signal comprising delayed traffic symbols. The short delay element 418 delays the power control symbols by a second predetermined time to produce a delayed power control designator. The delay element 420 may be implemented as a first-in-first-out (FIFO) buffer which establishes the first predetermined time by which the traffic symbols are delayed. Similarly, the short delay element 418 may be implemented as a FIFO buffer which establishes the second predetermined time by which the traffic symbols are delayed.

In accordance with the present invention, the second predetermined time is less than the first predetermined time. The first channel estimator 408 is characterized by a first group delay. Similarly, the second channel estimator is characterized by a second group delay. The second group delay is preferably shorter than the first group delay. The first predetermined time is established substantially equal to the first group delay. Similarly, the second predetermined time is established substantially equal to the second group delay. The second predetermined time is preferably less than 500 microseconds or the short delay element 418 may be omitted to reduce the complexity of the receiver design while maintaining adequate accuracy of performance.

The short delay element 418 conveys the delayed power control designator to the power control demodulator 424. The delay element 420 conveys the delayed traffic symbols to the traffic channel demodulator 422. The traffic channel demodulator 422 and the power control demodulator 424 are preferably implemented as multipliers. The power control demodulator 424 multiplies the delayed power control designator by the complex conjugate of the complex representation of the channel phase and the channel gain received from the second conjugate generator 414. The traffic channel demodulator 422 multiplies the delayed traffic symbols by the complex conjugate of the complex representation of the channel phase and the channel gain received from the first conjugate generator 412. The demodulated power control designator and the demodulated traffic symbols are then available for further processing, as in the combiner 118 (FIG. 1).

FIG. 5 shows an operational block diagram of a second alternative receiver circuit 500. The receiver circuit 500 is configured to be coupled to an antenna 502 and includes a filter circuit 504, a despreader 505, a pilot channel decoder 506, a causal filter portion 508, an anti-causal filter portion 510, a summer 512, a delay element 514, a first conjugate generator 516 and a second conjugate generator 518. The receiver circuit 500 further includes a traffic channel decoder 520, a switch 521, a short delay element 522, a delay element 524, a power control demodulator 526 and a traffic channel demodulator 528. Operation of the receiver circuit 500 to detect, despread, decode and demodulate a spread spectrum communication signal having a traffic channel, pilot channel and power control designator, is generally consistent with operation of the receiver circuit 400 illustrated in FIG. 4, with variations to be described below.

The causal filter portion 508 and anti-causal filter portion 510 together form a FIR filter. In the receiver circuit 500, the pilot channel decoder 506 provides the pilot symbols to causal filter portion 508 of the FIR filter, including the center coefficient. In response, the causal filter portion 508 generates a causal output. The pilot channel decoder 506 also provides the pilot symbols to the anti-causal filter portion 510 of the FIR filter. In response, the anti-causal filter portion 510 generates an anti-causal output.

The causal output is used as an early channel estimate for demodulation of the power control designator without added delay. The causal filter portion 508 provides the causal output to second conjugate generator 518 for generation of the complex conjugate of the causal output. This complex conjugate is provided to the power control demodulator 526.

The power control demodulator 526 multiplies the complex conjugate and power control symbols received from the traffic channel decoder 520, demodulating the power control symbols.

The causal output is also provided to the delay element 514, which delays the causal output by a predetermined time, which is preferably equal to the length of the anticausal filter, to produce a delayed causal output. The summer 512 produces a final channel estimate by adding the delayed causal output and the anti-causal output. The summer provides the final channel estimate to the conjugate generator 516 for generation of a complex conjugate. The conjugate is provided to the traffic channel demodulator 528. The traffic channel demodulator 528 multiplies the complex conjugate and the traffic symbols received from the traffic channel decoder 520, demodulating the traffic symbols.

As a variation, if a short delay can be tolerated for the demodulation of the control bits, the causal filter portion should include a few, say M, anti-causal coefficients. In this case, the power control symbols should be delayed by M symbols before being demodulated using the current early channel estimate.

FIG. 6 is an operational block diagram of a power control channel estimator 600 for use in the receiver circuit 400 of FIG. 4. The channel estimator 600 is in the form of a low pass filter which exponentially averages sequential values of the pilot symbols to produce the complex representation of the estimated channel gain and the estimated channel phase. The channel estimator 600 includes a shifter 602, a summer 604, a shifter 606, a summer 608, a delay element 610 and a quantizer 612. The channel estimator 600 receives the pilot symbols from the pilot channel decoder 406. The pilot symbol is in the form of an 8 bit binary value. The shifter 602 shifts a current pilot symbol 2 bits to the left, forming a 10 bit value. The summer 604 adds the current pilot symbol with a delayed pilot symbol received from delay element 610. The sum, an 11 bit binary value, is shifted 3 bits to the right by shifter 606. The summer 608 sums this value with the delayed pilot symbol received from delay element 610, producing a 10 bit value. The sum is provided to delay element 610 for processing with the next subsequent pilot symbol. The sum is also provided to the quantizer 612, which keeps the 8 most significant bits as the channel estimate.

As can be seen from the foregoing, the present invention provides a method and apparatus for demodulating a spread spectrum communication signal, including power control bits. Channel phase and channel gain are jointly estimated by averaging or low pass filtering pilot symbols. The traffic symbols are delayed slightly to accommodate the filtering delay. The power control bits are not delayed or delayed only a short time to ensure detection of and response to the power control bits within a specified time duration. The inventors have determined that the joint estimation method according to the present invention provides near-optimal estimates for both phase and gain of the channel. A DS-CDMA receiver implemented in according to the present invention provided a frame error rate (FER) 0.7 to 0.9 dB better than the conventional design using a phase locked loop for channel phase estimation and a separate channel gain estimator. The FER is only 0.15 dB off from the result obtained using perfect channel phase and gain information to demodulate traffic symbols. In addition, the present invention may be readily implemented in either hardware or software or a combination of the two. Further, the present invention allows DS-CDMA power control bits to be detected within the specified time duration of 500 microseconds.

While a particular embodiment of the present invention has been shown and described, modifications may be made. For example, the filter used for estimating channel phase and channel gain may be implemented using FIR or IIR techniques. The level of accuracy of the estimate may be tailored to the acceptable level of complexity of the filter. The filters that produce the first and the second complex channel estimates may be substantially the same. Also, it will be recognized that the operational elements of the receiver circuit 400, receiver circuit 500 and channel estimator may be implemented in hardware, in software or any combination of the two which enhances efficiency and performance of the design. It is therefore intended in the appended claims to cover all such changes and modifications which fall within the true spirit and scope of the invention.

What is claimed is:

1. A method of demodulating a spread spectrum communication signal, the method comprising the steps of:

receiving the spread spectrum communication signal over a communication channel;

detecting a pilot channel signal in the spread spectrum communication signal, producing pilot symbols;

filtering the pilot symbols to obtain an estimated channel gain and an estimated channel phase for the communication channel;

detecting in the spread spectrum communication signal a traffic channel signal, producing traffic symbols and a power control designator;

delaying the traffic symbols by a first predetermined time, producing delayed traffic symbols;

delaying the power control designator by a second predetermined time to produce a delayed power control designator, the second predetermined time being different from the first predetermined time;

demodulating the delayed traffic symbols using the estimated channel gain and the estimated channel phase; and demodulating the delayed power control designator using the estimated channel gain and the estimated channel phase.

2. The method of claim 1 wherein the step of filtering the pilot symbols comprises the steps of filtering the pilot symbols to obtain a first estimated channel gain and a first estimated channel phase, and filtering the pilot symbols to obtain a second estimated channel gain and a second estimated channel phase, and wherein the step of demodulating the delayed traffic symbols comprises using the first estimated channel gain and the first estimated channel phase, and wherein the step of demodulating the delayed power control designator comprises using the second estimated channel gain and the second estimated channel phase.

3. The method of claim 1 wherein the second predetermined time is substantially zero milliseconds.

4. The method of claim 3 wherein the first predetermined time is in a range of about 0.5 to 2 milliseconds.

5. A receiver circuit for receiving a spread spectrum communication signal over a communication channel the spread spectrum communication signal including a pilot channel signal, a traffic channel signal and a power control designator, the receiver circuit comprising:

a despreader configured to receive the spread spectrum communication signal and a despreading code, the despreader producing a despread signal in response to the spread spectrum communication signal and the despreading code;

a pilot channel decoder coupled to the despreader, the pilot channel decoder applying a pilot channel code to detect the pilot channel signal;

a first channel estimator coupled to the pilot channel decoder for producing a first estimated channel gain and a first estimated channel phase;

a second channel estimator coupled to the pilot channel decoder for producing a second estimated channel gain and a second estimated channel phase;

a traffic channel decoder coupled to the despreader, the traffic channel decoder applying a user specific traffic code to detect the traffic channel signal including the power control designator;

a delay element coupled to the traffic channel decoder for delaying the traffic channel signal a first predetermined time, the delay element producing a delayed traffic channel signal;

a short delay element coupled to the traffic channel decoder for delaying the power control designator a second predetermined time, the second predetermined time being less than the first predetermined time, the short delay element producing a delayed power control designator;

a traffic channel demodulator coupled to the delay element and the first channel estimator for demodulating the delayed traffic channel signal in response to the first estimated channel gain and the first estimated channel phase; and a power control demodulator coupled to the short delay element and the second channel estimator for demodulating the delayed power control designator in response to the second estimated channel gain and the second estimated channel phase.

6. A receiver circuit as recited in claim 5 wherein the second predetermined time is substantially zero milliseconds.

7. A receiver circuit as recited in claim 5 wherein the first channel estimator and the second channel estimator are substantially identical.

8. A receiver circuit as recited in claim 5 wherein the second channel estimator comprises a low pass filter for averaging sequential values of the pilot channel signal to produce the second estimated channel gain and the second estimated channel phase.

9. A receiver circuit as recited in claim 7 wherein the pilot channel signal comprises pilot symbols and wherein the second channel estimator comprises a summer and a delay element, the delay element receiving a pilot symbol and producing a delayed pilot symbol, the summer adding a current pilot symbol and the delayed pilot symbol to produce the second estimated channel gain and the second estimated channel phase.

10. A receiver circuit as recited in claim 5 wherein the first channel estimator comprises an anti-causal filter portion which generates an anti-causal output in response to the pilot channel signal and the second channel estimator comprises a causal filter portion which generates a causal output in response to the pilot channel signal to produce the second estimated channel gain and the second estimated channel phase, and wherein the receiver circuit further includes a delay element for delaying the causal output to produce a delayed causal output and a summer for summing the anti-causal output and the delayed causal output to produce the first estimated channel gain and the first estimated channel phase.

11. A receiver circuit as recited in claim 5 wherein the first channel estimator comprises a low pass filter, the low pass filter having a first group delay, and wherein the first predetermined time is substantially equal to the first group delay.

12. A receiver circuit as recited in claim 11 wherein the second channel estimator comprises a low pass filter having a second group delay, and wherein the second predetermined time is substantially equal to the second group delay.

13. A method for demodulating DS-CDMA signals which include a pilot channel signal, a traffic channel signal and a power control channel, the method comprising the steps of:

(a) jointly estimating a traffic channel phase and a traffic channel gain;

(b) separately estimating a power control channel phase and a power control channel gain;

(c) delaying the traffic channel signal by a first predetermined time to produce a delayed traffic channel signal;

(d) demodulating the delayed traffic channel signal using the traffic channel phase and the traffic channel gain;

(e) delaying the power control channel by a second predetermined time to produce a delayed power control channel; and (f) demodulating the delayed power control channel using the power control channel phase and the power control channel gain.

14. A method as recited in claim 13 wherein the second predetermined time is less than the first predetermined time.

15. A method as recited in claim 14 wherein the second predetermined time is substantially zero milliseconds.

16. A method as recited in claim 13 wherein step (a) comprises a step of low pass filtering the pilot channel signal to produce the traffic channel phase and the traffic channel gain.

17. A method as recited in claim 16 wherein step (a) further comprises the step of, after the step of low pass filtering, generating a complex conjugate to produce the traffic channel phase and the traffic channel gain.

18. A method as recited in claim 13 wherein the power control channel comprises one or more power control bits.

19. A method of demodulating a spread spectrum communication signal, the spread spectrum communication signal including a pilot signal, the pilot signal having a predetermined form for decoding by all receivers, the method comprising the steps of:

receiving the spread spectrum communication signal over a communication channel;

detecting the pilot signal in the spread spectrum communication signal and producing pilot symbols;

detecting a traffic channel signal in the spread spectrum communication signal and producing traffic symbols;

filtering the pilot symbols to estimate the channel gain and the channel phase;

delaying only the traffic channel symbols a predetermined time to produce a delayed signal; and demodulating the delayed signal using the estimated channel phase and channel gain.

20. The method of claim 19 wherein the step of detecting a traffic channel signal comprises the steps of:

applying a pseudorandom noise pattern to the spread spectrum communication signal; and despreading the spread spectrum communication signal in response to the pseudorandom noise pattern to produce a despread signal.

21. The method according to claim 19 wherein the predetermined time is in a range from about 0.5 millisecond to 2 milliseconds.

22. A method of demodulating a spread spectrum communication signal, the method comprising the steps of:

receiving the spread spectrum communication signal over a communication channel;

detecting a pilot channel signal in the spread spectrum communication signal by applying a pilot code to the despread signal and decoding the despread signal in response to the pilot code to produce the pilot channel signal;

detecting a traffic channel signal in the spread spectrum communication signal by applying a pseudorandom noise pattern to the spread spectrum communication signal and despreading the spread spectrum communication signal in response to the pseudorandom noise pattern to produce a despread signal;

filtering the pilot channel signal to estimate a channel gain and a channel phase for the spread spectrum communication signal;

delaying only the traffic channel signal a predetermined time to produce a delayed signal; and demodulating the delayed signal using the estimated channel phase and channel gain.

23. The method of claim 22 wherein the step of detecting a traffic channel signal comprises the steps of:

applying a user specific traffic code to the despread signal; and decoding the despread signal in response to the user specific traffic code to produce the traffic channel signal.

24. The method of claim 22 wherein the pilot code is common to all users.

25. A receiver configured to be coupled to an antenna for receiving a spread spectrum communication signal over a communication channel, the spread spectrum communication signal including a pilot signal, the receiver comprising:

a despreader configured to be coupled to the antenna for despreading the spread spectrum communication signal and producing a pilot channel in response to the pilot signal and a traffic channel;

a filter coupled to the despreader for producing an estimate of channel gain and channel phase for the communication channel in response to the pilot channel;

a delay element coupled to the despreader for delaying the traffic channel a predetermined time and producing a delayed traffic channel; and a demodulator coupled to the delay element and the filter, the demodulator demodulating the delayed traffic channel in response to the channel phase and the channel gain.

26. A receiver as recited in claim 25 wherein the filter is characterized by a group delay and wherein the predetermined time is substantially equal to the group delay.

27. A receiver configured to be coupled to an antenna for receiving a spread spectrum communication signal over a communication channel, the receiver comprising:

a despreader configured to be coupled to the antenna for despreading the spread spectrum communication signal and producing a pilot channel signal and a traffic channel signal;

a filter coupled to the despreader for producing an estimate of channel gain and channel phase for the communication channel;

a delay element coupled to the despreader for delaying the traffic channel signal a predetermined time and producing a delayed traffic channel signal;

a demodulator coupled to the delay element and the filter, the demodulator demodulating the delayed traffic channel signal in response to the channel phase and the channel gain; and a conjugate generator coupled between the filter and the demodulator, the conjugate generator determining a complex conjugate of a signal produced by the filter and providing the complex conjugate to the demodulator.

28. A receiver as recited in claim 27 wherein the demodulator comprises a multiplier, the multiplier multiplying the delayed traffic channel signal and the complex conjugate to demodulate the delayed traffic channel signal.

29. A receiver configured to be coupled to an antenna for receiving a spread spectrum communication signal over a communication channel, the receiver comprising:

a despreader configured to be coupled to the antenna for despreading the spread spectrum communication signal and producing a pilot channel signal and a traffic channel signal, the pilot channel signal comprising a series of pilot symbols;

a filter coupled to the despreader for producing an estimate of channel gain and channel phase for the communication channel, the filter comprising a buffer for storing a predetermined number of pilot symbols and a summer, the buffer shifting a new pilot symbol into the buffer and shifting an oldest pilot symbol out of the buffer, the summer summing contents of the buffer and the new pilot symbol to produce the estimate of channel gain and channel phase;

a delay element coupled to the despreader for delaying the traffic channel signal a predetermined time and producing a delayed traffic channel signal; and a demodulator coupled to the delay element and the filter, the demodulator demodulating the delayed traffic channel signal in response to the channel phase and the channel gain.

30. A receiver as recited in claim 29 wherein the filter further comprises a precombiner coupled to the despreader for receiving pilot symbols, the precombiner combining subsequently received pilot symbols, forming combined pilot symbols, the precombiner providing the combined pilot symbols to the buffer and the summer.

31. A method for demodulating a direct sequence code division multiple access (DS-CDMA) signal received in a receiver, the DS-CDMA signal including traffic symbols and pilot symbols, the method comprising the steps of:

filtering the pilot symbols to produce an estimate of channel gain and channel phase;

delaying the traffic symbols for a predetermined time, producing delayed traffic symbols; and demodulating the delayed traffic symbols in response to the channel gain and phase.

32. The method of claim 31 wherein the method further comprises the step of providing a low pass filter for filtering the pilot symbols, the low pass filter being characterized by a group delay, and wherein the method further comprises the step of establishing the predetermined time substantially equal to the group delay.

33. The method of claim 31 wherein the filtering step comprises the steps of sampling a predetermined number of pilot symbols, multiplying sampled pilot samples by weighting coefficients and combining products to produce the estimate of channel gain and channel phase.

* * * * *